July 26, 1955

W. A. E. HULT 2,713,749

SOILLESS CULTURE OF PLANTS USING
CHEMICALLY TREATED OCEAN WATER
Filed Aug. 6, 1951

INVENTOR.
WILLIAM A. E. HULT

BY Knox & Knox

AGENTS

United States Patent Office 2,713,749
Patented July 26, 1955

2,713,749

SOILLESS CULTURE OF PLANTS USING CHEMICALLY TREATED OCEAN WATER

William A. E. Hult, San Diego, Calif.

Application August 6, 1951, Serial No. 240,592

4 Claims. (Cl. 47—1.2)

The present invention relates generally to a method for germinating seeds and growing plants in chemically treated ocean water and more particularly to a method for further treating sea water from which the chlorides have been removed, for use in germinating seeds and growing plants by the addition of a nutrient composition thereto.

The primary object of this invention is to use sea water to provide a growing medium for seeds and plants without the use of soil.

A second object is to provide a liquid containing the necessary nutrients to stimulate growth of plant life.

A third object of this invention is to provide a method for producing a growing medium for plants, making use of sea water which has been converted into suitable irrigation water and to which is added a nutrient composition that will provide the necessary plant food required to germinate seeds and to grow plants.

Finally, it is an object to teach a method of the aforementioned character which is simple, safe and convenient to use, and which will give generally efficient and satisfactory results.

With these and other objects definitely in view, this invention consists in the means and method hereinafter fully described in the specification, particularly pointed out in the claims, and illustrated in the drawing which forms a material part of this disclosure, and wherein similar characters of reference indicate similar or identical elements and portions throughout the specification and the drawing, wherein:

The present invention makes use of converted sea water, the apparatus for the production of which is described in applicant's Patent No. 2,546,071, issued March 20, 1951. Silver nitrate is added to sea water, whereby the chloride ion is removed as the insoluble silver chloride, while the sodium and magnesium remain in solution in the form of nitrates. The silver chloride which settles to the bottom of the container may be recovered by filtration or settling, to be later refined for reuse, or the treated water may be siphoned from the containers as required to save the silver metal which is a costly item in this process. The treated water is then ready for use in irrigation of plants and for use in my present method.

After treatment of ocean water briefly set forth above the approximate percentages of the respective constituents relative to the total weight of all solutes would be as follows:

| Constituent: | Per cent of total |
|---|---|
| Sodium nitrate—$NaNO_3$ | 80.0 |
| Magnesium nitrate—$Mg(NO_3)_2$ | 12.1 |
| Magnesium sulphate—$MgSO_4$ | 3.3 |
| Calcium sulphate—$CaSO_4$ | 2.5 |
| Potassium sulphate—$K_2SO_4$ | 1.8 |
| Calcium carbonate—$CaCO_3$ | 0.2 |
| Minor constituents | 0.1 |
| | 100.0 |

I have discovered that plants can be grown satisfactorily without soil by the addition of the proper nutrient elements to this chemically treated sea water, in the designated proportions listed below:

| Constituent: | Per cent of total |
|---|---|
| Potassium sulphate | 42.5 |
| Calcium sulphate | 32.5 |
| Monocalcium phosphate | 12.5 |
| Magnesium sulphate | 2.5 |
| Ammonium sulphate | 7.5 |
| Iron sulphate—$FeSO_4$ | 1.8 |
| Manganese sulphate | 0.28 |
| Borax—$Na_2B_4O_7$ | 0.22 |
| Zinc sulphate | 0.12 |
| Copper sulphate | 0.08 |
| | 100.0 | one (1) pound being sufficient nutrient for 100 gallons of treated ocean water.

It has been illustrated that the growth of plants can be controlled by means of adding essential nutrient elements to fresh water, the experimentation having been extended to fruits, vegetables and grains intended for healthful, human consumption. The same results can be obtained by chemically changing the composition of the solutes contained in sea water and by adding the essential nutrient compounds not already contained in the resultant water, in controlled amounts.

In operations involving hydroculture, it has been discovered that different plants require different pH. Therefore, due to the facts that the sodium nitrate and magnesium nitrate are contained in excess in my treated sea water, and that some plants require more potassium than others, for proper growth, the pH is controlled by the addition of potassium sulphate to the nutrient formula, to keep the pH scale reading of the nutrient solution at approximately 6.0 for plants and 8.0 for field crops.

Figure 1:
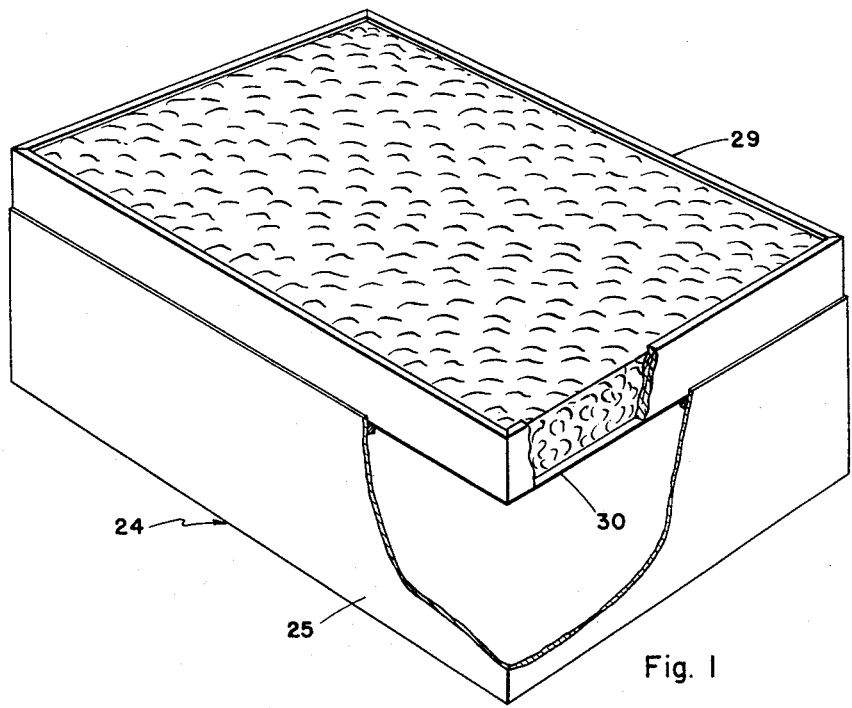
Fig. 1 is a view, in perspective, partly broken away, of a seed bed frame.

Figure 1 is a view of apparatus which may be used to implement my method of soilless culture, this view being in perspective and partially broken away to disclose underlying parts.

Figure 2:
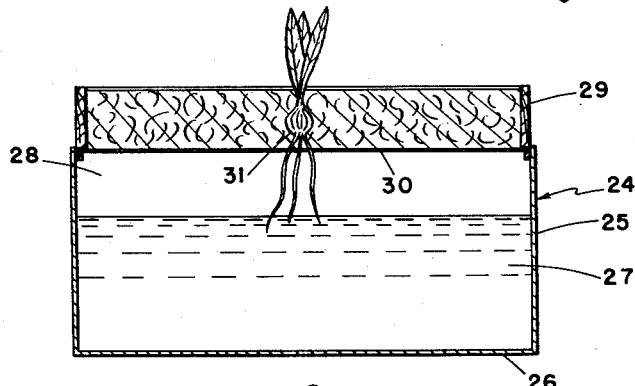
Fig. 2 is a transverse sectional view showing the nutrient solution.

Figure 2 is cross-sectional view of the apparatus shown in Figure 1, the view being taken on a central transverse sectional line with the representation of water and a plant to illustrate further the use of the apparatus.

The liquid produced by my method may be used in plant culture as illustrated in the figures in the drawing, wherein a frame 24 includes a tank or basin 25 with a flat bottom 26. The tank 25 is divided into three vertically tiered sections. The nutrient solution 27 produced by my method as disclosed above is maintained in tank 25 at a depth of the order of four inches. An air space 28 of approximately 2 inches is maintained above the nutrient solution 27. The seed bed tray 29 is suspended above the nutrient solution 27. This tray has a wire netting or screen bottom 30 which rests on top of the edge portions of the basin 25. Seed bedding composed of a thin porous mat of vegetable litter, such as excelsior, leaf mold, peat-moss, wood shavings, bagasse, straw or an equivalent commercial product, is placed upon the wire netting or screen 30. The seed 31 is planted in the seed bedding and the water below evaporates to provide sufficient moisture for germination until such time as the roots reach the solution held in the tank and indicated at 27.

It also has been found that the air space will vary according to the needs of various plants and may, of course, be varied according to the age of any one plant by shifting the seed tray relative to the nutrient solution held in the basin.

It will be recognized by those skilled in the art of hydroponic culture that substitution of equivalents for ingredients or chemicals used in my formula may be made and said equivalents, or the disclosed chemicals may be varied in minor proportions but I have disclosed the best proportions and the best chemicals to be used for obtaining the optimum results in plant growth and seed germination under conditions ordinarily maintained by horticulturists with respects to temperature, light and sun.

What is claimed is:

1. The method comprising the addition of silver nitrate to sea water, agitating the resulting solution, removing the resultant liquid portion, whereby chlorides are removed from and nitrates are added to the treated sea water, adding to the treated water a mixture comprising:

| Constituent: | Per cent of total |
|---|---|
| Potassium sulphate | 42.5 |
| Calcium sulphate | 32.5 |
| Monocalcium phosphate | 12.5 |
| Magnesium sulphate | 2.5 |
| Ammonium sulphate | 7.5 |
| Iron sulphate—$FeSO_4$ | 1.8 |
| Manganese sulphate | 0.28 |
| Borax—$Na_2B_4O_7$ | 0.22 |
| Zinc sulphate | 0.12 |
| Copper sulphate | 0.08 | one pound of said mixture in each 100 gallons of treated ocean water, supporting a layer of cellular material a short distance above a layer of nutrient solution consisting of the treated sea water with said mixture added thereto, the space between said nutrient solution and said cellular material permitting access of air to roots of plants to be grown in said cellular material, whereby seeds can be germinated and plants grown without soil.

2. A method for hydroponic culture, comprising placing a layer of nutrient solution in a seedbed tank, said nutrient solution comprising ocean water treated to eliminate chlorides and having dissolved therein one pound of a compound including

| Constituent: | Per cent of total |
|---|---|
| Potassium sulphate | 42.5 |
| Calcium sulphate | 32.5 |
| Monocalcium phosphate | 12.5 |
| Magnesium sulphate | 2.5 |
| Ammonium sulphate | 7.5 |
| Iron sulphate—$FeSO_4$ | 1.8 |
| Manganese sulphate | 0.28 |
| Borax—$Na_2B_4O_7$ | 0.22 |
| Zinc sulphate | 0.12 |
| Copper sulphate | 0.08 |
| | 100.0 | in each 100 gallons of treated ocean water, supporting a layer of cellular material a short distance above said layer of nutrient solution, the space between said nutrient solution and said cellular material permitting access of air toward plant roots, whereby seeds can be germinated and plants grown without soil.

3. A method for hydroponic culture, comprising placing a layer of nutrient solution in a seedbed tank, said nutrient solution comprising ocean water treated to eliminate chlorides and having dissolved therein one pound of a compound including

| Constituent: | Per cent of total |
|---|---|
| Potassium sulphate | 42.5 |
| Calcium sulphate | 32.5 |
| Monocalcium phosphate | 12.5 |
| Magnesium sulphate | 2.5 |
| Ammonium sulphate | 7.5 |
| Iron sulphate—$FeSO_4$ | 1.8 |
| Manganese sulphate | 0.28 |
| Borax—$Na_2B_4O_7$ | 0.22 |
| Zinc sulphate | 0.12 |
| Copper sulphate | 0.08 |
| | 100.0 | in each 100 gallons of ocean water from which the chlorides have been removed, and adding potassium sulphate to adjust the pH of the solution to the requirements of the plant growth concerned, supporting a layer of cellular material a short distance above said layer of nutrient solution, the space between said nutrient solution and said cellular material permitting access of air toward plant roots, whereby seeds can be germinated and plants grown without soil.

4. A method for hydroponic culture, comprising placing a layer of nutrient solution in a seedbed tank, said nutrient solution comprising ocean water treated to eliminate chlorides and having dissolved therein one pound of a compound including

| | Per cent |
|---|---|
| Potassium sulphate | 42.5 |
| Calcium sulphate | 32.5 |
| Monocalcium phosphate | 12.5 |
| Magnesium sulphate | 2.5 |
| Ammonium sulphate | 7.5 |
| Iron sulphate—$FeSO_4$ | 1.8 |
| Manganese sulphate | 0.28 |
| Borax—$Na_2B_4O_7$ | 0.22 |
| Zinc sulphate | 0.12 |
| Copper sulphate | 0.08 | said percentages being by weight, in each 100 gallons of treated ocean water, and adding potassium sulphate to adjust the pH of the solution to the requirements of the plant growth concerned, to keep the pH scale reading at 6.0 for garden plants and 8.0 for field crop seedlings, supporting a layer of cellular material a short distance above said layer of nutrient solution, the space between said nutrient solution and said cellular material permitting access of air toward plant roots, whereby seeds can be germinated and plants grown without soil.

References Cited in the file of this patent

UNITED STATES PATENTS

| 1,950,701 | Spangenberg | Mar. 13, 1934 |
| 2,211,918 | Turrentine | Aug. 20, 1940 |
| 2,213,619 | Bancroft et al. | Sept. 3, 1940 |
| 2,436,652 | Lee | Feb. 24, 1948 |
| 2,546,071 | Hult | Mar. 20, 1951 |

OTHER REFERENCES

Ellis et al.: "Soilless Growth of Plants," 2nd ed.; published, 1947, by Reinhold Pub Co., N. Y.; pp. 15, 58, 135, 138, 142, 143, 144, 155–160, 214, 237, 242, 243.